United States Patent

[11] 3,602,490

[72] Inventors Allen H. Mueller;
Ernest Wilson, both of Houston, Tex.
[21] Appl. No. 860,648
[22] Filed Sept. 24, 1969
[45] Patented Aug. 31, 1971
[73] Assignee Mandrel Industries, Inc.
Houston, Tex.

[54] SEISMOMETER SPRING
6 Claims, 5 Drawing Figs.
[52] U.S. Cl. .................................................. 267/161,
340/17
[51] Int. Cl. ..................................................... F16f 1/34
[50] Field of Search ........................................ 267/161,
162, 165; 340/17

[56] References Cited
UNITED STATES PATENTS
2,127,688 8/1938 Hoerbiger ................... 267/161
3,344,397 9/1967 Elliott et al. ................. 267/161

Primary Examiner—James B. Marbert
Attorney—Robert G. Clay

ABSTRACT: The two mediately positioned cantilevered rings of four spaced concentric rings of resilient spring material are joined to adjacent rings at diametrically opposite locations by resilient bridges to form a leaf spring structure having inner and outer support rings bridged to respective anchor sides of adjacent inner and outer mediately positioned cantilevered rings whose free ends are joined by a resilient bridge. In one embodiment the inner and outer rings are mounted respectively by a slipring assembly to the fixed reference and the suspended inertial mass to allow relative rotation between each of them and the leaf spring structure when subjected to tortuous forces.

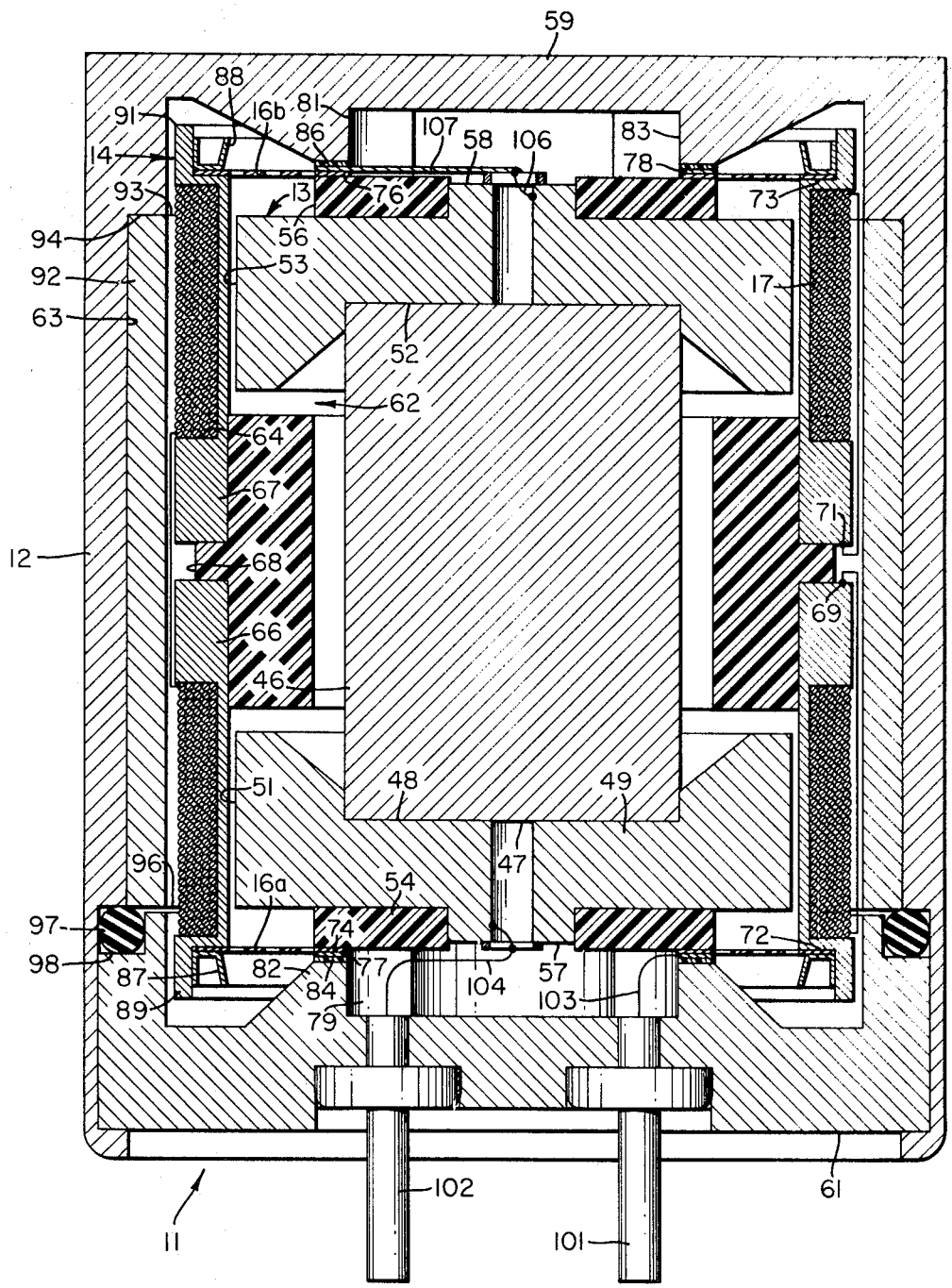
FIG_1
INVENTORS
ALLEN H. MUELLER,
ERNEST WILSON
BY
*Robert H. Clay*
ATTORNEY

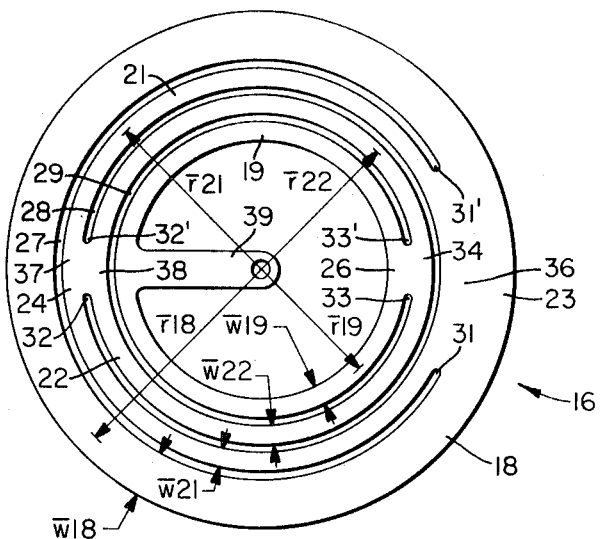
FIG_2
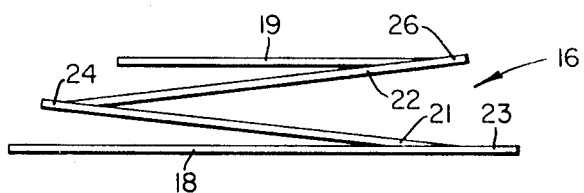
FIG_3
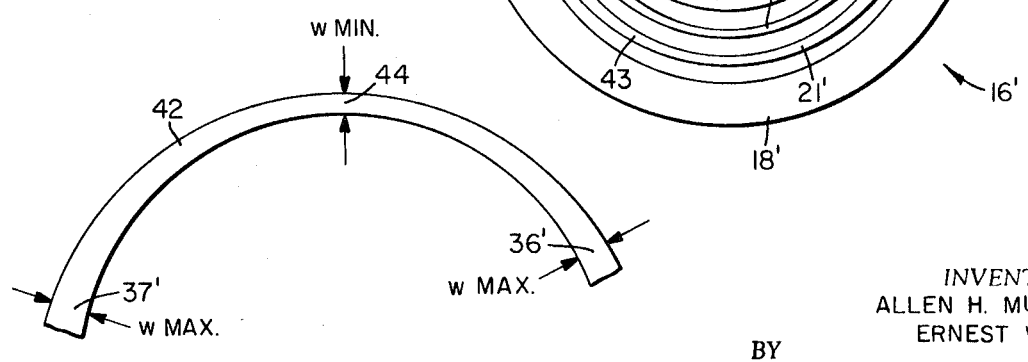
FIG_4
FIG_5

SEISMOMETER SPRING

FIELD OF THE INVENTION

The present invention relates generally to seismometer suspension springs. More particularly, it relates to a seismometer spring comprised of a plurality of joined cantilevered concentric rings.

BACKGROUND OF THE INVENTION

Seismometers employed in geophysical exploring generally include a magnetic assembly and a magnetic flux-sensitive device, for example, a conducting coil, one of which serves as an inertial mass and the other as a rigid supporting member. The inertial mass is supported from the rigid supporting member by a spring suspension system so that, as the transducer is subjected to seismic disturbances, the spring-suspended inertial mass moves relative to the rigid supporting member to cause the flux-sensitive device to generate a corresponding signal. Either helical or flat springs have been employed to suspend the inertial mass. Because small, compact seismometers are desired for geophysical exploring applications, they commonly employ flat spring assemblies having a single mediately positioned spring member supported at both of its sides between inner and outer supporting spring members.

Heretofore, the allowable elastic displacement of the flat springs has been restricted. This restriction on the elastic displacement has limited the low frequency response and linear range of the seismometers as well as the maximum stress levels they are able to withstand. In addition, when displaced by an accelerating force, the springs of the prior art tend to produce an internal tortuous force which generates distortion in the output signal. Moreover, instead of moving smoothly through the range of its displacement, as such springs are subjected to seismic disturbance, they abruptly flex as they pass through their rest position, thereby, producing discontinuous instead of simple harmonic motion. Because prior art flat springs are sensitive to tortuous forces, seismometers are constructed with springs whose torque characteristics are matched to minimize distortion. Furthermore, seismometers use delicate springs which are fixed against rotation to the rigid supporting member and inertia mass. Large tortuous forces often permanently deform the rotatably immobile delicate springs.

Therefore, considerable advantage is to be gained by providing a flat spring for suspending an inertial mass from a rigid support member of a seismometer which is insensitive to tortuous forces. Additional advantages are to be gained by providing a seismometer spring configuration which facilitates constructing a rugged seismometer linearly sensitive to a large range of seismic forces.

SUMMARY OF THE INVENTION

Accordingly, it is an object of the present invention to render seismometer springs insensitive to tortuous forces.

More particularly, it is an object of the present invention to extend the useful elastic displacement range of seismometer springs.

Another object of the present invention is to provide a seismometer spring whose displacement force characteristic is continuous throughout its elastic displacement range to thereby be productive of simple harmonic motion.

A further object of the present invention is to facilitate the manufacture of seismometers by obviating the requirement of matching spring torque characteristics.

Still another object of the present invention is to extend the low frequency response of seismometers without complicating its structure.

Yet another object of the present invention is to improve the ruggedness of seismometers.

In accordance with the present invention, the seismometer spring comprises at least two spaced concentrically nested cantilevered annuli of resilient spring material joined together so that as the spring is subjected to seismic forces a continuous elastic displacement is produced. More particularly, two annuli form cantilevered structures joined together at their respective free sides by a resilient bridge. Locations of the cantilevered annuli opposite their free sides define the anchor sides of the cantilevered structures. The anchor side of the inner most cantilevered annulus is joined by a resilient bridge to an innermost resilient spring support member. An outermost resilient spring support member is joined by a resilient bridge to the anchor side of the outermost most cantilevered annulus. The support members serve to attach the leaf spring between the inertia mass and rigid support member of the seismometer.

With at least two cantilevered annuli mediately supported between inner and outer support members, the spring structure does not generate undesirable distortion-producing tortuous forces when subjected to seismic forces. Furthermore, it has been found that the use of at least two cantilevered annuli eliminates abrupt flexing characteristics of the prior art springs, thereby, providing a seismometer spring which is characterized by simple harmonic motion throughout its entire range of elastic displacement. The two cantilevered mediately supported annuli also increase the displacement range over that characteristic of prior art seismometer spring structures. Because of the construction of the spring of the present invention, it is able to be elastically displaced through a greater range. Hence, seismometers employing the spring of the present invention are characterized by a lower frequency response limit, a greater linear operating range, and being more rugged than prior art seismometers of comparable size.

BRIEF DESCRIPTION OF THE DRAWINGS

The foregoing and other objects and advantages of the present invention will become more apparent from the following description and claims considered together with the accompanying drawings of which:

FIG. 1 is a cross-sectional elevation view of a seismometer using the spring of the present invention.

FIG. 2 is a plan view of one embodiment of the spring of the present invention.

FIG. 3 is an end view of the spring embodiment of FIG. 2 illustrating its extended configuration.

FIG. 4 is a plan view of another embodiment of the spring of the present invention.

FIG. 5 is a portion of the spring embodiment of FIG. 4 delineated by lines 5—5.

DESCRIPTION OF THE PREFERRED EMBODIMENT

Referring to FIG. 1, a seismometer 11 is illustrated as constructed for detecting the vibrating characteristics of earth tremors artificially produced when conducting geophysical explorations. The seismometer 11 has a cylindrical metal housing 12 within which a permanent magnet assembly 13 and coil assembly 14 are mounted. One of assemblies 13 and 14 serves as the fixed reference rigid support structure while the other serves as the inertial mass. Top and bottom springs 16a and 16b of the present invention suspend one of the assemblies 13 and 14 relative to the other so that relative vibrating forces resulting from earth tremors cause relative movement between the coil 17 carried by the coil assembly 14 and the lines magnetic flux generated by the magnet assembly 13. This relative movement induces a voltage signal in the coil 17 indicative of the character of the earth tremor.

With reference to FIG. 2, one embodiment of the spring 16 of the present invention which can be employed in the seismometer 11 of FIG. 1 is illustrated. The spring 16 comprises four radially spaced concentrically nested annuli in the form of rings 18, 19, 21, and 22 of resilient spring material interconnected by diametrically staggered resilient bridge members 23, 24, and 26 to form a spring structure which is flat when unloaded. In the preferred embodiment, the spring 16 is fabricated from a thin sheet or disc of high reluctance, conductive resilient spring material, for example, 0.0075-inch-thick beryllium copper alloy, by etching three concentric arcuate slots 27, 28 and 29 at radially spaced locations. The unslotted portions between the ends 31 and 31', 32 and 32' and 33 and 33' of each of the arcuate slots 27, 28 and 29 respectively form the resilient bridge members 23, 24, and 26 interconnecting the rings 18, 19, 21 and 22. Thus, the arcuate slots 27, 28 and 29 are etched in the thin disc so that the unslotted portion associated with the mediately located arcuate slot 28 is centered at a location which is diametrically opposite the centers of the unslotted portions associated with the inner and outer located arcuate slots 27 and 29.

In use, the outermost and innermost rings 18 and 19 serve as support members and are coupled respectively, for example, to the coil assembly 14 and permanent magnet assembly 13 to suspend one of the assemblies from the other as the inertial mass of the seismometer 11. In the seismometer 11 illustrated in FIG. 1, the coil assembly 14 serves as the inertial mass and is suspended from the permanent magnet assembly 13 which serves as the fixed reference rigid support structure. The innermost mediately located ring 22 is cantilevered from the innermost support ring 19 at its anchor side 34 by the bridge member 26. The outermost mediately located ring 21 is cantilevered from the outermost support ring 18 at its anchor side 36 by the bridge member 23. The structure of the spring 16 is completed by joining the free sides 37 and 38 of the mediately located cantilevered rings 21 and 22 with the bridge member 24.

As discussed hereinabove, the use of two cantilevered rings 21 and 22 prevents the generation of undesirable distortion characteristic of the prior art spring structures as a result of the tortuous forces produced when the seismometer is subjected to seismic forces. Consideration of FIG. 3 will provide a better understanding of the manner in which undesirable distortion is prevented by the structure of the spring 16 of the present invention. As the spring 16 is subjected to forces causing the outer and inner support leaves 18 and 19 to be displaced axially apart, the cantilevered rings 21 and 22 are pivoted at the bridges 23 and 26 axially away from each other. This produces a radial force component at the bridges 23 and 26. However, this radial force component is absorbed by the radially inward displacement of the free sides of the cantilevered leaves 21 and 22 at the joining bridge 24. Hence, only the axial displacing force remains.

The prior art spring structures have three spring members with one of its members extending between two others which serve as support members. Spring members or rings 19, 22 and 21 or FIG. 3 can be considered as depicting the prior art spring configuration, with ring 21 serving as the second support member. In such prior art structures, the aforementioned radial force tends to displace the bridges 24 and 26 radially towards each other. Because the seismometers are constructed to oppose radial displacements between their coil assembly and permanent magnet assembly, this radial force component causes the support members to rotate about the spring axis towards one another to maintain the distance between the bridges 24 and 26 constant. This rotation tends to distort the spring thereby generating distortion in the output signal provided by the seismometer. Furthermore, this relative rotation between the support members of the prior art seismometers tends to cause abrupt flexing of the members, thereby, producing a displacing motion other than one of a simple harmonic variety which results in the response of the seismometer being nonlinear through its elastic deflection range. In addition, since flat springs of this type do not freely deflect in the circumferential direction, they are easily permanently deformed when subjected to large seismic forces.

For the foregoing reasons, the prior art seismometers can be subjected to only a limited range of accelerating forces. However, because the bridged free sides of the cantilevered leaves 21 and 22 of the spring 16 of the present invention are able to freely move radially, no undesirable tortuous forces are produced when it is subjected to seismic forces. Hence, seismometers employing the springs 16 of the present invention are characterized by being free of the aforedescribed limitations and disadvantages of the prior art seismometers.

Referring again to FIG. 2, in constructing seismometers in accordance with the present invention, the mean radii $\bar{r}_{18}$, $\bar{r}_{19}$, $\bar{r}_{21}$, and $\bar{r}_{22}$ and the mean widths $\bar{w}_{18}$, $\bar{w}_{19}$, $\bar{w}_{21}$, $\bar{w}_{22}$ of the rings 18, 19, 21, and 22 are selected to provide a seismometer 11 having a particular natural resonance frequency of inertial mass motion. Is in the case of prior art seismometers, the mean radii and widths selected for the rings depend upon the size of the suspended inertial mass and the desired maximum deflection of the spring 16.

The spring embodiment of FIG. 2 has a tab 39 extending radially inward from an annular inner ring 19 which serves to secure the spring 16, for example, to the permanent magnet assembly of a seismometer. The tab 39 also may be used to provide electrical coupling between the coil 17 and an external connector. A solid disc could be used in place of the annular ring 19.

However, referring now to FIG. 4, a spring 16' embodiment is illustrated which allows the spring 16' to be mounted to allow relative rotation between the permanent magnet and the coil assemblies, for example, 13 and 14 of the seismometer 11. In the embodiment of FIG. 4 the innermost ring 19' is circular defining an aperture 41. The inside radius of the circular ring 19' is selected so that the aperture 41 can receive therethrough the member to which the innermost ring 19' is mounted. As will be explained in greater detail hereinafter with reference to FIG. 1, the annular configuration of the innermost ring 19' together with the outermost ring 18' allow the spring 16' to be supported for relative rotation between the spring and the members to which they are mounted. Furthermore, by employing sliprings to support the spring 16' the spring 16' mounting means can serve to couple electrically the coil 17 of the seismometer 11 to an external connector.

To more uniformly distribute the spring stresses the width of each half of each of the cantilevered rings 21' and 22' are tapered from a maximum width at the point midway therebetween equal to about one-half the maximum width. More particularly, referring to FIG. 5, one half section 42 of the tapered outermost cantilevered ring 21' is illustrated. The other half section 43 of the cantilevered ring 21' is identical to the half section 42. The half section 42 has a maximum width, $w_{max}$, at its anchor side 36' and its free end 37'. The width of the half section 42 of the cantilevered ring 21' is tapered from both sides 36' and 37' to a minimum width, $w_{min}$, at its midpoint 44 equal to about one-half its maximum width, $w_{max}$. In one embodiment constructed in accordance with FIGS. 4 and 5, each of the mediately located cantilevered leaves 21' and 22' was tapered from a maximum width, $w_{max}$, equal to 0.040 inch at their anchor sides and free sides to a minimum width, $w_{min}$, equal to 0.020 inch.

Referring again to FIG. 1, two springs 16a and 16b of the present invention are employed in the seismometer 11 and are mounted between the permanent magnet assembly 13 and coil assembly 14 so as to allow relative rotation and axial displacement therebetween. More specifically, the assembly 13 includes a cylindrical permanent magnet 46 having a top end 47 seated within a circular recess 48 defined in a circular web portion 49 of a cylindrical top pole piece 51. The bottom end 52 of the permanent magnet 46 is similarly seated in a cylindrical bottom pole piece 53. The permanent magnet assembly 13 serves as the fixed reference rigid support member from which the coil assembly 14, serving as the inertial mass, is spring suspended. The permanent magnet assembly 13 is positioned in place within the housing 12 by top and bottom centering insulating rings 54 and 56 fitted over the hubs 57 and 58 respectively extending from the web portion of the top and bottom pole pieces 51 and 53. The bottom centering ring 56 rests on the bottom plate 59 of the housing 12 while the top centering ring 54 rests against the top plate 61 of the housing 12.

The diameters of the permanent magnet assembly 13 and housing 12 are selected so that a space 62 is provided between the permanent magnet assembly 13 and the inside wall 63 of the housing 12 for receiving the coil assembly 14 therein. The coil assembly 14 is suspended from the permanent magnet assembly 13 by the identical top and bottom leaf springs 16a and 16b. The coil assembly 14 includes a cylindrical coil form 64 comprising upper and lower nonmagnetic conductive sections 66 and 67 separated insulatingly apart by an interposed ring 68 of insulating material. The coil 17 is formed by winding wire covered with a coating of insulation about the two sections 66 and 67 of the coil form 64. One end 69 of the coil 17 is joined to form a good electrical connection, as by soldering, to the upper conductive section 66. The other end 71 of the coil 17 is similarly joined to the lower conductive section 67.

To suspend the coil assembly 14 from the permanent magnet assembly 13, the coil form 64 is provided with top and bottom shoulders 72 and 73 extending around its circumference. The centering rings 54 and 56 have upper and lower shoulders 74 and 76 respectively opposite and opening towards the shoulder 72 and 73. The outer support ring 18 and inner support ring 19 of each of the springs 16a and 16b respectively rest on the oppositely facing shoulders. Upper and lower sliprings 77 and 78 are fitted around the collars 79 and 81 of the centering rings 54 and 56 to rest snugly against the inner support ring 19 of the springs 16a and 16 b while allowing rotational motion therebetween. The upper slipring 77 is held in place by rim 82 extending from the top plate 61. The lower slipring 68 is held in place by a rim 83 extending from the bottom plate 59. Insulator spacers 84 and 86 are sandwiched respectively between slipring 77 and rim 82 and between slipring 78 and rim 83.

The springs 16a and 16b are held in place against the shoulders 72 and 73 of the coil form 64 by U-shaped resilient retainer rings 87 and 88 wedgingly fitted against the rims 89 and 91 extending from the shoulders 72 and 73.

A low reluctance path for the magnetic lines of force is provided by a cylindrical pole piece 92 surrounding the coil assembly 14 in spaced relation therefrom. One end 93 of the pole piece 92 is seated on a circumferential shoulder 94 cut into the inner wall 63 of the housing 12. The other end 96 of the pole piece 92 engages an O-ring 97 resting on the shoulder 98 extending circumferentially about the top plate 61.

In addition to supporting the leaf springs 16a and 16b for rotational motion relative to the permanent magnet assembly 13, the sliprings 77 and 78 provide the means of electrically coupling the coil 17 to external connectors 101 and 102 insulatingly extending through the top plate 61. The connector 101 is joined to a conductor 103 which connects to the slipring 77, hence, end 69 of the coil 17 through the conductive upper section 66 of the coil form 64. The connector 102 is joined to a conductor 104 which is joined to the top pole piece 51. The magnet assembly 13 provides a conductive path to conductor 106 which is joined between the bottom pole piece 53 and a tab 107 extending from the slipring 78. The slipring 78 provides the electrical connection to the bottom spring 16b, hence, the other end 71 of the coil 17 through the conductive lower section 67 of the coil form 64.

While the seismometer 11 illustrated in FIG. 1 is of the type wherein the coil assembly 14 serves as the inertial mass, the permanent magnet assembly 13 could be suspended by the leaf springs 16a and 16b to serve as the inertial mass.

We claim:

1. A flat spring for use in seismometers to suspend an inertial mass structure from a fixed reference rigid support structure which structures are coil and magnet assemblies comprising; first support member of resilient spring material for supporting the spring at one of said structures, a second support member of resilient spring material for supporting the spring at the other of the structures; and first and at least second concentrically nested spaced annular members of resilient spring material located between the support members, each of said annular members having an anchor side and free side at diametrically opposite locations, the first annular member fixed at the inside of its anchor side to be cantilevered from the first support member, the second annular member fixed at the outside of its anchor side to be cantilevered from the second support member circumjacent the first annular member to have its free side juxtaposed the free side of said first annular member, the juxtapositioned free sides of said cantilevered annular members joined together.

2. The spring according to claim 1 wherein the first and second support members are of an annular configuration, the first annular support member is concentrically nested and radially spaced within the first annular cantilevered member, and the second annular support member is concentrically nested and radially spaced circumjacent the second annular cantilevered member.

3. The spring according to claim 2 further comprising bridge portions joining the anchor sides of the annular cantilevered members to the support members and the free sides of the annular cantilevered members together.

4. The spring according to claim 2 wherein the annular support members and cantilevered members are portions of a thin sheet of resilient spring material having at least three spaced generally concentric arcuate slots each of which has a pair of slot ends and a midpoint, the slots are relatively oriented with the midpoint of each slot located diametrically opposite that of adjacent slots.

5. The spring according to claim 1 wherein each of the annular cantilevered members has a varying width along its extent with the width maximum at its anchor and free sides and minimum about halfway in between the anchor and free sides.

6. The spring according to claim 5 wherein the minimum width is approximately one-half the maximum width.